United States Patent
Pieder et al.

(10) Patent No.: US 9,973,117 B2
(45) Date of Patent: May 15, 2018

(54) SYSTEM HAVING A FIRST ELECTRIC MOTOR AND A SECOND ELECTRIC MOTOR FOR DRIVING A STRING

(71) Applicant: ABB Technology AG, Zurich (CH)

(72) Inventors: Joerg Pieder, Domat/Ems (CH); Paolo Belli, Mailand (IT)

(73) Assignee: ABB SCHWEIZ AG, Baden (CH)

( * ) Notice: Subject to any disclaimer, the term of this patent is extended or adjusted under 35 U.S.C. 154(b) by 393 days.

(21) Appl. No.: 14/706,589

(22) Filed: May 7, 2015

(65) Prior Publication Data

US 2015/0244293 A1 Aug. 27, 2015

Related U.S. Application Data

(63) Continuation of application No. PCT/EP2013/073276, filed on Nov. 7, 2013.

(30) Foreign Application Priority Data

Nov. 7, 2012 (EP) ..................................... 12191670

(51) Int. Cl.
*H02K 7/20* (2006.01)
*H02P 5/747* (2006.01)
*F04B 15/06* (2006.01)
*H02K 7/00* (2006.01)
*H02K 19/10* (2006.01)
*H02P 29/50* (2016.01)

(52) U.S. Cl.
CPC .............. *H02P 5/747* (2013.01); *F04B 15/06* (2013.01); *H02K 7/00* (2013.01); *H02K 19/10* (2013.01); *H02P 29/50* (2016.02)

(58) Field of Classification Search
CPC ......... H02P 5/747; H02P 29/50; H02K 19/10; H02K 7/00
USPC .................. 310/112, 113, 114; 318/434, 611
See application file for complete search history.

(56) References Cited

U.S. PATENT DOCUMENTS 503,681 A * 8/1893 Crofts .................... B65D 25/32
220/776
2010/0135825 A1 6/2010 Walth
(Continued)

FOREIGN PATENT DOCUMENTS

| EP | 2 099 124 A2 | 9/2009 |
|---|---|---|
| EP | 2 099 124 A3 | 5/2014 |

(Continued)

OTHER PUBLICATIONS

Machine Translation for EP 2 099 124 Jul. 13, 2017.*
(Continued)

Primary Examiner — Hanh Nguyen
(74) Attorney, Agent, or Firm — Barnes & Thornburg LLP

(57) ABSTRACT

An exemplary system includes a first electric motor and a second electric motor, which are coupled mechanically to one another via a common string of the system. The string has a torsional natural oscillation at a natural frequency. A first oscillating torque acts on the string by the first electric motor and a second oscillating torque acts on the string by the second electric motor. The second electric motor is arranged with respect to the first electric motor such that the effect of the second oscillating torque on the string results in damping of the excitation of the natural oscillation owing to the first oscillating torque.

16 Claims, 4 Drawing Sheets

(56) References Cited

U.S. PATENT DOCUMENTS

| | | | |
|---|---|---|---|
| 2012/0074707 | A1 | 3/2012 | Pedersen |
| 2013/0057099 | A1* | 3/2013 | Murray, III ............ H02K 16/00 |
| | | | 310/114 |
| 2013/0129473 | A1* | 5/2013 | Hutten ................... H02P 23/04 |
| | | | 415/1 |
| 2013/0157805 | A1* | 6/2013 | Keller ...................... G05B 5/01 |
| | | | 477/3 |

FOREIGN PATENT DOCUMENTS

| | | |
|---|---|---|
| JP | S53-035125 A | 4/1978 |
| JP | S53-121119 A | 10/1978 |
| JP | S54-155416 A | 12/1979 |
| JP | S58-124096 U | 8/1983 |
| JP | H01-025897 U | 2/1989 |
| JP | 2009-273355 A | 11/2009 |

OTHER PUBLICATIONS

International Search Report (PCT/ISA/210) dated May 30, 2015, by the European Patent Office as the International Searching Authority for International Application No. PCT/EP2013/073276.

Written Opinion (PCT/ISA/237) dated May 30, 2015, by the European Patent Office as the International Searching Authority for International Application No. PCT/EP2013/073276.

European Search Report dated Jun. 3, 2013, by the European Patent Office in corresponding European Patent Application No. 12191670.4-1804.

Siemens AG; "Siemens liefert vier seiner leistungsstärksten Stromrichter-Giessharztransformatoren für das Hamburger Steinkohlekraftwerk Moorburgn", Jun. 25, 2010, XP007921874, pp. 1-2.

Hutten et al. "Torsional Interharmonic Interaction Study of 75 MW Direct-Driven VSDS Motor Compressor Trains for LNG Duty", Proceedings of Thirty-Seventh Turbo Machinery Symposiums, Jan. 1, 2008, XP007920625, pp. 57-66.

Schramms et al., Damping torsional interharmonic effects of large drives, IEEE 6th International Power Electronics and Motion Control Conference, 2009 : IPEMC '09 ; Wuhan, China, May 17-20, 2009, 20090517 IEEE, Piscataway, NJ, USA—ISBN 978-1-4244-3556-2 ; ISBN 1-4244-3556-0, XP031535158, pp. 484-490.

Notification of Transmittal of Translation of the International Preliminary Report on Patentability (Forms PCT/IB/338 and PCT/IB/373) and the Written Opinion of the International Searching Authority (Form PCT/ISA/237) dated May 21, 2015, by the International Bureau of WIPO in corresponding International Application No. PCT/EP2013/073276.(11 pages).

\* cited by examiner

SYSTEM HAVING A FIRST ELECTRIC MOTOR AND A SECOND ELECTRIC MOTOR FOR DRIVING A STRING

RELATED APPLICATION(S)

This application claims priority as a continuation application under 35 U.S.C. § 120 to PCT/EP2013/073276 filed as an International application on Nov. 7, 2013, designating the U.S., and claiming priority to European application 12191670.4 filed on Nov. 7, 2012. The content of each prior application is hereby incorporated by reference in its entirety.

FIELD

The present disclosure relates to a system for the liquefaction of gas, in particular natural gas.

BACKGROUND INFORMATION

The known system has two electric motors, which are connected mechanically to one another via a common shaft. A compressor or a compressor system can be arranged as load on the shaft. The rotating components, e.g., the shaft, the rotors of the compressor, clutches between motor shafts and the compressor shaft and also the rotors of the motors, are referred to as the string.

It is known that such systems have natural oscillations. Campbell diagrams are used for the analysis and also for the documentation of such natural oscillations.

One disadvantage with such a system has proven to be that the electric motors can excite natural oscillations of the string. These natural oscillations therefore should be damped or their excitation should be prevented since the natural oscillations could otherwise damage or even destroy the system.

SUMMARY

An exemplary system is disclosed comprising: a first electric motor and a second electric motor, which are coupled mechanically to one another via a common string, wherein the string has a torsional oscillation at a natural frequency, wherein a first oscillating torque acts on the string by the first electric motor and a second oscillating torque acts on the string by the second electric motor, and wherein the first electric motor and the second electric motor are arranged on respectively opposite end regions of the string, and wherein the second electric motor is arranged with respect to the first electric motor such that an effect of the second oscillating torque on the string results in damping of an excitation of the natural oscillation by the first oscillating torque.

DESCRIPTION OF THE DRAWINGS

Reference will now be made in detail to the various embodiments as illustrated in the drawings, in which.

DETAILED DESCRIPTION

Figure 1:
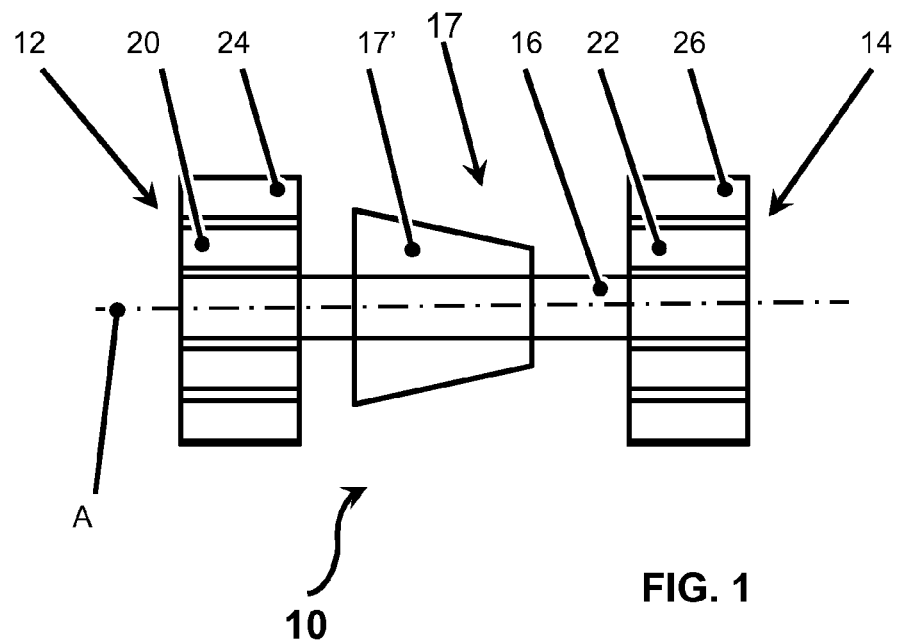
FIG. 1 shows a side view of a mechanical system in accordance with an exemplary embodiment of the present disclosure.

Exemplary embodiments of the present disclosure provide a system in which the problem of the excitation of specific natural frequencies of the load can be solved.

According to an exemplary embodiment, a system includes a first electric motor and a second electric motor, which are coupled mechanically to one another via a common string of the system, wherein the string has a torsional natural oscillation at a natural frequency, wherein a first oscillating torque acts on the string by the first electric motor, and a second oscillating torque acts on the string by the second electric motor, and wherein the second electric motor can be arranged with respect to the first electric motor in such a way that the effect of the second oscillating torque on the string results in damping of the excitation of the natural oscillation owing to the first oscillating torque.

Because of the exemplary arrangement of the second electric motor with respect to the first electric motor, at least one natural oscillation of the string can be damped in a targeted manner. If the damping can be optimal, the natural oscillation can even be cancelled. As a result, the system does not specify any further components or regulation operations, which prevent or control the excitation of this natural oscillation. As a result, the system can be manufactured at lower cost. The operation of the system can be more reliable since the natural oscillation cannot occur, or can only occur to a damped degree, owing to the design.

According to an exemplary system of the present disclosure, the first electric motor can be driven by a first drive of the system, and the second electric motor can be driven by a second drive of the system, wherein the first drive and the second drive are in the form of current-source DC-link converters.

The implementation of the drives as current-source DC-link converters enables inexpensive operation of the system.

According to an exemplary embodiment of the present disclosure, one of the two electric motors of the system can be in the form of a synchronous machine. In a another exemplary embodiment, the first electric motor and the second electric motor are in the form of a synchronous machine.

According to another exemplary embodiment disclosed herein, at least one electric motor is a synchronous machine that enables inexpensive operation of the system in a high power range, such as above 60 MW.

According to an exemplary embodiment of the present disclosure, the first electric motor can be driven by the first drive of the system and the second electric motor can be driven by a second drive of the system, the first drive and the second drive are connected to a supply grid via phase conductors. The first drive has a first converter and the second drive has a second converter, wherein the first converter and the second converter are in each case in the form of externally commutated power converters on the side of the supply grid and on the side of the first motor or the second motor.

According to yet another exemplary embodiment of the present disclosure, the second converter can be operated with a phase shift through a phase shift angle $\Delta ph_N$ with respect to the first converter.

This makes it possible to optimize the reaction on the grid of the system; such as the coupling of undesirable frequencies into the supply grid can be prevented. For example, the second drive may have a second transformer, by which the phase shift through the phase shift angle $\Delta ph_N$ is realized.

According to an exemplary embodiment of the present disclosure, the first converter and the second converter are each in the form of twelve-pulse power converters on the side of the supply grid and on the side of the first electric motor or the second electric motor. And according to yet another exemplary embodiment of the present disclosure, in each case one grid-side power converter of the first converter and of the second converter (49) can be in the form of an externally commutated thyristor power converter with phase gating control. In accordance with a further, exemplary embodiment of the present disclosure, in each case one load-side power converter of the first converter and of the second converter can be in the form of an externally commutated thyristor power converter with phase gating control.

According to another exemplary embodiment of the system which can be combined with the other exemplary embodiments, the second electric motor can be arranged so as to be radially rotated through a relative motor angle $\Delta ph_M$ with respect to the first motor, wherein the relative motor angle can be at least approximately $$\Delta ph_M = \frac{\Delta ph_N}{360\ deg} \frac{1}{f_N} \frac{N_N}{1/f_M - 1/f_N} (360°/N_M)$$

where $f_N$ can be the frequency of the supply grid, $f_M$ can be the frequency of the load-side power converter, $N_N$ can be the pulse number of the grid-side power converter, $N_M$ can be the pulse number of the load-side power converter (62).

For example, if $\Delta ph_N$ can be different from zero, thanks to this formula damping of a natural oscillation of the string or even cancelling of a natural oscillation can be achieved even during operation of the two grid-side power converters with a phase shift of $\Delta ph_N$. As a result, the system can be designed without any special protection concepts or systems in respect of a specific natural oscillation of the string, as a result of which the system overall can be manufactured at lower cost and can be operated more safely.

According to an exemplary embodiment of the system as described in the present disclosure, the second stator can be arranged radially around a stator angle $\varphi_{St}$ with respect to the first stator, the second rotor can be arranged so as to be rotated radially through a rotor angle $\varphi_R$ with respect to the first rotor, wherein $\Delta ph_M = \varphi_R - \varphi_{St}$ holds true for the relative motor angle.

According to yet another exemplary embodiment of the system as described herein, which can be combined with the other exemplary embodiments, the string has a load, which can be a compressor system. Such a system can have a power of the two electric motors of at least 60 MW.

According to another exemplary embodiment of the system as described in the present disclosure, which can be combined with the other exemplary embodiments, the first electric motor has a first rotor and a first stator, the second electric motor has a second rotor and a second stator, wherein the second rotor is not radially aligned with the first rotor and/or the second stator is not radially aligned with the first stator.

Exemplary embodiments of the present disclosure will be described by way of example with reference to the appended drawings. These exemplary embodiments of the disclosure are non-restrictive examples of the invention.

Figure 2:
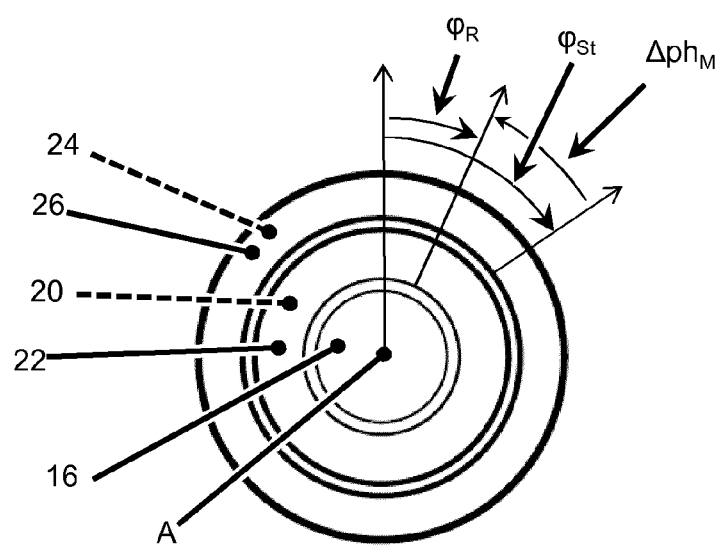
FIG. 2 shows the mechanical system shown in FIG. 1 in the direction of the longitudinal axis in accordance with an exemplary embodiment of the present disclosure.

FIG. 1 shows a side view of a mechanical system in accordance with an exemplary embodiment of the present disclosure, and FIG. 2 shows the mechanical system shown in FIG. 1 in the direction of the longitudinal axis in accordance with an exemplary embodiment of the present disclosure. Namely, FIGS. 1 and 2 illustrate a mechanical system 10 that includes a first electric motor 12, a second electric motor 14, and a common shaft 16, via which the first electric motor 12 and the second electric motor 14 are coupled mechanically to one another. For reasons of simplicity, the electric motors are referred to as motors for short. A load 17' can be fitted on the shaft 16. Such mechanical systems 10 are used, for example, for a gas liquefaction plant, wherein, in this case, the load 17' can be a compressor or a compressor system consisting of a plurality of compressors for liquefying gas, such as natural gas. The rotating components of the mechanical system 10 are referred to as a string 17. These components can include, for example, a first rotor 20 of the first motor 12, a second rotor 22 of the second motor 14, the shaft 16 and the load 17' and any further components such as, for example, clutches between the respective rotor 20, 22 and the shaft 16. In order to drive the load 17' in the case of a natural gas liquefaction plant, known systems can call for drive powers of between 60 MW (megawatts) and 120 MW. However, plants with a higher drive power are already in the planning stage. For example, this drive power can be applied half each by each of the two motors 12, 14 so that each of the two motors 12, 14 can output a power of 30 MW to 60 MW to the shaft 16. Alternatively, one of the two motors 12, 14 can be dimensioned to output a higher drive power than the other motor 12, 14, for example the first motor 12 could be configured to output a drive power of between 70 MW and 100 MW and the second motor 14 could be configured for a drive power of up to 20 MW.

The first motor 12 and the second motor 14 are designed to drive the shaft 16 and the load 17'. The shaft 16 together with the load 17' forms, as already mentioned above, the string 17. For this purpose, the first rotor 20 of the first motor 12 can be coupled mechanically to the shaft 16. Likewise, the second rotor 22 can be coupled to the shaft 16. According to an exemplary embodiment, the first rotor 20 and the second rotor 22 can be connected directly to the shaft 16 or formed thereon. According to still another exemplary embodiment, one or else both rotors 20, 22 could be coupled to the shaft 16 via a transmission (not shown in the drawing).

A first stator 24 of the first motor 12 can be arranged around the first rotor 20 and a second stator 26 of the second motor 14 can be arranged around the second rotor 22. As shown in FIG. 1, the first motor 12 and the second motor 14 can be arranged on respectively opposite end regions of the shaft 16. Other arrangements are likewise possible, however.

Figure 3:
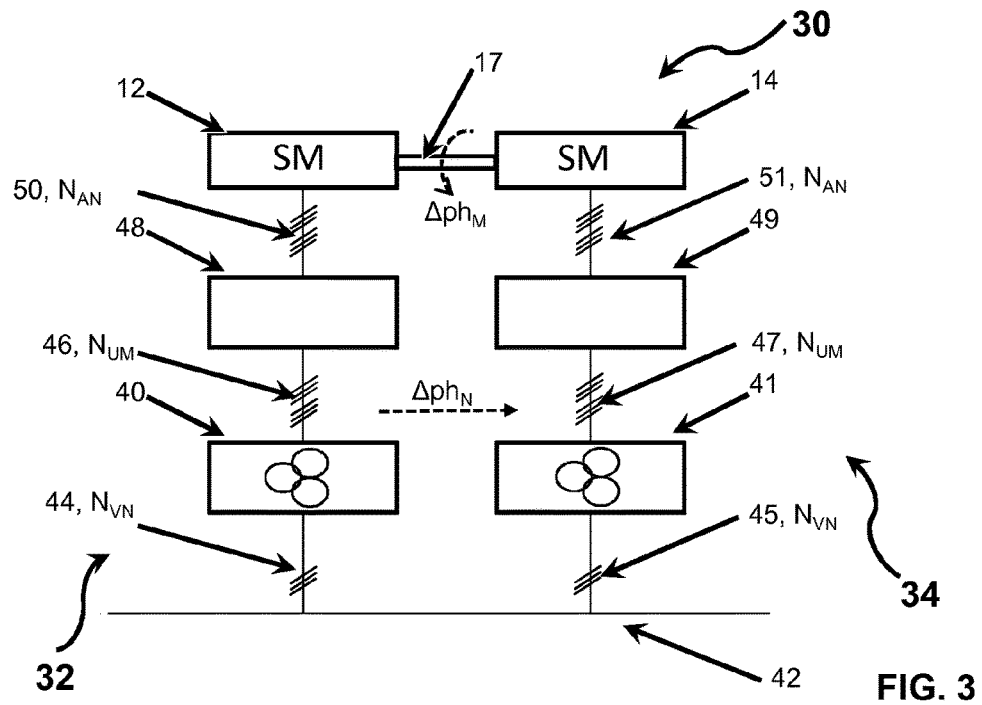
FIG. 3 shows an exemplary arrangement of an electrical system for driving the first and second motors in accordance with an exemplary embodiment of the present disclosure.
Figure 4:
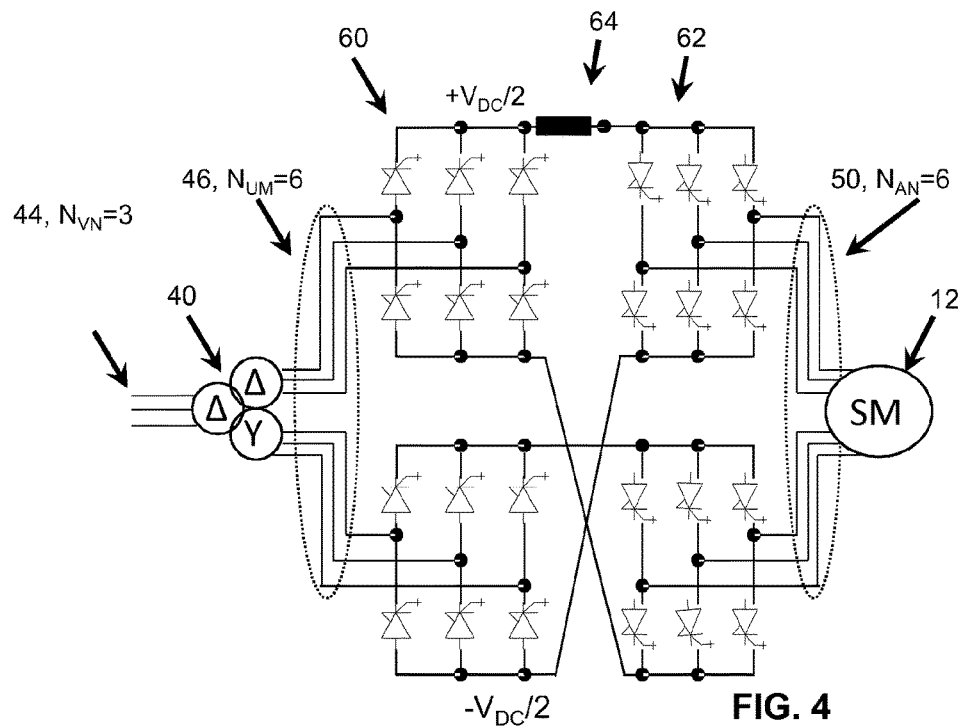
FIG. 4 shows an exemplary embodiment of a converter for the electrical system in accordance with an exemplary embodiment of the present disclosure.

According to a first exemplary embodiment of the present disclosure, the first motor 12 and the second motor 14 are in the form of a synchronous machine (denoted by SM in FIGS. 3 and 4). However, another exemplary embodiment of the disclosure can also in principle be implemented using an asynchronous machine.

The string 17 can be as rigid as possible, but can be excited by different, specific natural frequencies to cause natural oscillations, for example torsional oscillations. In the case of the torsional oscillation, an oscillation takes place around the rotational degree of freedom of the string 17, in the present case around the longitudinal axis A of the string 17. In a first eigen mode of the natural oscillation at the first natural frequency, only one end of the string 17 or of the shaft 16 rotates with respect to the other end of the string 16 or the shaft 16. In a second eigen mode of the natural oscillation at the second natural frequency, both ends of the string 17 oscillate in synchronism with one another, but the central section of the string 17 oscillates in an opposite circumferential direction with respect to the oscillation of the two ends. The natural oscillations of the string 17 can also occur while the string 17 is rotating, e.g., the natural oscillation can be superimposed on a constant rotary movement of the string 17.

According to an exemplary embodiment, the first stator 24 can be used as a fixed coordinate system for the following considerations of the two stators 24, 26 of the first and second motors 12, 14. The second stator 26 can be arranged in principle as desired on the longitudinal axis A of the mechanical system 10 which can be defined by the shaft 16, in the circumferential direction. As can be shown in FIG. 2, the angle through which the second stator 26 can be arranged to be rotated with respect to the first stator 24 can be referred to as the stator angle $\varphi_{St}$. The stator angle $\varphi_{St}$ can therefore be zero or different from zero. Given a stator angle of $\varphi_{St}=0$, the poles of the second stator 26 in the direction of the longitudinal axis A are congruent with the poles of the first stator 24.

According to an exemplary embodiment of the present disclosure, the system of coordinates for the rotating components of the mechanical system 10, such as for the string 17, the first rotor 20 and the second rotor 22, can be defined by the first rotor 20. The second rotor 22 can be arranged on the mechanically unloaded shaft 16, e.g., as long as the mechanical system 10 can be at a standstill and no torque can be exerted on the shaft 16 by the first motor 12, the second motor 14 or else by the load 17', in a manner rotated through an angle which can be referred to as below as the rotor angle $\varphi_R$. The rotor angle $\varphi_R$ can therefore be zero or different from zero. Given a rotor angle of $\varphi_R=0$, the poles of the second rotor 22 in the direction of the longitudinal axis A are congruent with the poles of the first rotor 20. Furthermore, in FIG. 2, the angle can be illustrated relative to the motor angle $\Delta ph_M$ between the stator angle $\varphi_{St}$ and the rotor angle $\varphi_R$.

Under mechanical loading of the string 17, said string can rotate as a function of time, since the shaft 16 and the load 17' are not entirely rigid. Mechanical loading of the shaft 16 can be caused by the two motors 12, 14 and by the load 17'. For example, the two motors 12, 14 excite torsional natural oscillations of the string 17.

FIG. 3 shows an exemplary arrangement of an electrical system for driving the first and second motors in accordance with an exemplary embodiment of the present disclosure. Namely, FIG. 3 shows a drive system 30 for driving the first motor 12 and the second motor 14 of the system 10. The first motor 12 can be driven by the first drive 32, and the second motor 14 can be driven by the second drive 34. The drives 32, 34 are drives as are best known to a person skilled in the art for such purposes.

The first drive 32 can have a first transformer 40, which can be connected to a supply grid 42 via $N_{VN}$ phase conductors 44 on the side of said supply grid. The supply grid 42 can be a three-phase supply grid so that the first transformer 40 can be connected thereto via three ($N_{VN}=3$) phase conductors 44. On the side of the first motor 12, the transformer 40 can be connected to a first converter 48 via six ($N_{UM}=6$) phase conductors 46. The connection between the transformer 40 and the converter 48 can be identical to or an integral multiple of $N_{VN}$. In the present example, $N_{UM}=6$, where the six phases are phase-shifted with respect to one another.

The first converter 48 can be connected to the first motor 12 via $N_{AN}$ phase conductors 50. In known implementations, 3, 6, 12, 18 or 24 phase conductors 50 are used. In the present example, six ($N_{AN}=6$) phase conductors 50 are used.

The second drive 34 can have a largely similar design to the first drive 32.

The second drive 34 can have a second transformer 41, which can be connected to the supply grid 42 likewise via $N_{VN}$ phase conductors 45 on the side of said supply grid. On the side of the second motor 14, the second transformer 41 can be connected to a second converter 49 via six ($N_{UM}=6$) phase conductors 47. The connection between the second transformer 41 and the second converter 49 can be identical to or an integral multiple of $N_{VN}$. In the present example, $N_{UM}=6$, wherein the six phases are phase-shifted with respect to one another.

The second converter 49 can be connected to the second motor 14 via $N_{AN}$ phase conductors 51. In known implementations, 3, 6, 12, 18 or 24 phase conductors 51 are used. In the present example, six ($N_{AN}=6$) phase conductors 51 are used.

The six phases at the output of the second transformer 41 can be phase-shifted through a phase shift angle $\Delta ph_N$ with respect to the six phases at the output of the first transformer 40. This can be used, for example, to reduce destructive reactions of the drive system 30 on the supply grid 42. For example, a phase shift angle $\Delta ph_N$ of 15° in the case of the drive system shown in FIGS. 3 and 4 can be advantageous. However, the phase shift angle can also be different from 15° or else $\Delta ph_N=0°$.

The phase shift angle $\Delta ph_N$ can be therefore a grid-side electrical phase shift angle between the first converter 48 and the second converter 49.

FIG. 4 shows an exemplary embodiment of a converter for the electrical system in accordance with an exemplary embodiment of the present disclosure. Namely, FIG. 4 shows a detail view of FIG. 3. FIG. 4 shows three phase conductors 44 ($N_{VN}=3$), via which the first transformer 40 can be connected to the supply grid 42 (see FIG. 3). As shown, the first transformer 40 can be designed in such a way that six phase conductors 46 ($N_{UM}=6$) are connected to the first transformer 40 on the side of the first converter 48. The six phases are phase-shifted with respect to one another, wherein the phase shift can be 60° in the case of six phase conductors. The phase shift between the individual phases should be 360° divided by the number $N_{UM}$ of phase conductors 46, expressed as the formula: $360°/N_{UM}$. A 60° phase shift can be achieved, for example, by the three-phase supply grid 42 and via transformer windings which are delta-connected or Y connected.

Furthermore, FIG. 4 shows a grid-side power converter 60 of the first converter 48. The grid-side power converter 60 can be implemented by two six-pulse bridge rectifier circuits connected in series with one another. Together, they therefore form a twelve-pulse rectifier circuit. Other circuits are known to a person skilled in the art which are likewise twelve-pulse rectifier circuits. In the exemplary embodiment of the present disclosure now described, thyristors with phase gating control are shown as switching elements. The grid-side power converter 60 can be therefore in the form of an externally commutated power converter 60. The frequency of the grid-side power converter 60 can be therefore equal to the frequency of the supply grid 42 and can be denoted by $f_N$. $f_N$ can be therefore 50 Hz or 60 Hz, but can in principle be any desired frequency. Instead of the switching elements shown in FIG. 3, other switching elements could also be used as thyristors. Suitable power converter circuits are known to a person skilled in the art.

It should be understood that the $N_N$-pulse rectifier circuit can be achieved by rectification of $N_N/2$ phases, wherein the two half-cycles of the oscillations are rectified. If only the positive or only the negative half-cycles are rectified, the number of pulses can be equal to the number of phases which are phase-shifted with respect to one another. In the example shown in FIG. 4, $N_N=12$.

On the motor side or on the load side, the first converter 48 can have a load-side power converter 62. The load-side power converter 62 in the present example can be connected to the first motor 12 via six phase conductors 50 ($N_{AM}=6$). The phase conductors 50 can be connected independently of one another. For this purpose, the load-side power converter 62 in turn can have thyristors with phase gating control and can be again in the form of an externally commutated power converter. Further possibilities are best known to a person skilled in the art. Since either $+V_{DC}/2$ or $-V_{DC}/2$ can be applied to each of the phases, the inverter circuit can be referred to as a 12-pulse inverter. It should be understood that the number of pulses $N_M$ of the $N_M$-pulse-controlled inverter can be defined as follows: the number of phase conductors $N_{AN}*2$, where the $N_{AN}$ phase conductors 50 can be actuated with a phase shift at least with respect to one another. According to an exemplary embodiment, the $N_{AN}$ phase conductors 50 can be actuated independently of one another. In the exemplary embodiment shown in FIGS. 3 and 4, $N_M=12$.

Similarly to the first drive 32, the second drive 34 can have a grid-side power converter and a load-side power converter, which are each designed analogously to the grid-side power converter and the load-side power converter of the first drive 34.

In the present example, the first motor 12 and the second motor 14 are each formed with six stator windings, which are operated in star-connected fashion, for example. Each stator winding can be connected to one of the phase conductors 50 of the respective drive 32, 34.

The two load-side power converters 62 serve the purpose of driving the first motor 12 and the second motor 14 at a variable frequency so that the respective motor 12 or 14 rotates at a variable rotation speed. In the case of a 12-pulse inverter and a stator including six stator windings, the motor rotates at the motor frequency $f_{Mot}=f_M/N_{PP}$, where $N_{PP}$ can be the number of pole pairs of the stator, and $f_M$ can be the frequency of the load-side power converter. If $N_{PP}=1$, the motor rotates at the frequency $f_M$ of the load-side power converter 62. Since, however, other frequencies are also provided on each phase conductor 50, 51 in addition to the inverter frequency $f_M$, these frequencies result in superimposed positions. These further frequencies result in magnetic fields in the air gap of the first or second motor 12, 14 which do not rotate at the rotation speed and therefore result in pulsating torques, which act on the rotor.

Figure 5:
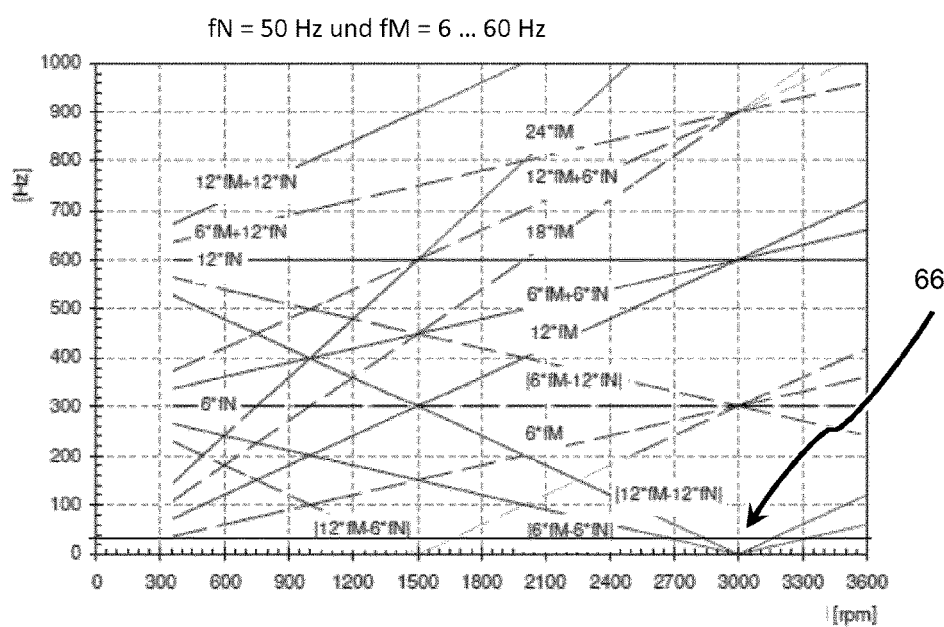
FIG. 5 shows a Campbell diagram in which frequencies of the oscillating torques of a string of the mechanical system plotted as a function of a rotational speed of the string and torsional natural frequencies of the string in accordance with an exemplary embodiment of the present disclosure.

FIG. 5 shows a Campbell diagram in which frequencies of the oscillating torques of a string of the mechanical system plotted as a function of a rotational speed of the string and torsional natural frequencies of the string in accordance with an exemplary embodiment of the present disclosure. For example, FIG. 5 illustrates a known Campbell diagram for the above-described first drive 32 and for the second drive 34, which have in each case one twelve-pulse power converter 60, 62 on the grid side and on the load side. The frequency of the supply grid and of the grid-side power converter 60 can be denoted by $f_N$ instead of $f_N$ in FIGS. 5 to 7. This frequency in the present example can be 50 Hz. The frequency of the load-side converter can be coupled with the variable rotation speed of the respective motor 12, 14, as specified above, and can be denoted by $f_M$ instead of $f_M$ in FIGS. 5 to 7. In FIG. 5, the rotation speed can be specified in revolutions per minute, wherein revolutions per minute has been abbreviated to rpm. The lines illustrated as continuous lines in FIG. 5 indicate the frequency profile of the integral harmonic, pulsating torques of the above-described 12-pulse system. The broken lines indicate the frequency profile of the non-integral, pulsating torques. In the exemplary Campbell diagram of the present disclosure, the pole pair number of the motors can be assumed to be 1. Therefore, the inverter frequency $f_M$ can be equal to the motor frequency.

In the Campbell diagram, the frequency profile of the pulsating torques can be illustrated as a function of the rotation speed rpm. These torque values can be measured, for example, in the storage DC link between the respective grid-side power converter 60 and the load-side power converter 62 and result in torques on the respective motor 12, 14 which do not correspond to the rotation speed of the motor.

Furthermore, by way of example, a frequency 66 of a torsional natural oscillation of the string 17 can be illustrated. The frequencies of the first, second and third natural oscillations can be, for example, 6 Hz, 19 Hz and 56 Hz, but are dependent on the configuration of the string 17. The frequencies of the torsional natural oscillations are independent of the instantaneous rotation speed of the string 17.

As can be seen from the Campbell diagram, the frequency 66 or the frequency profile of the natural oscillation of the string 17 and the frequency profiles of the pulsating torques intersect one another. Since the frequency $f_M$ of the load-side converter 62 changes with a change in speed of the string 17, a certain frequency band can be passed through, for example, when the string 17 can be run-up from the standstill state up to the desired rotation speed. This frequency band includes intersections of the natural frequency 66 of the string 17 with the oscillating torques caused by the drive. Since the run-up takes place relatively quickly, the string 17 is not excited largely given the natural frequencies of the string 17. However, intersections of the frequency profile 66 of the natural oscillation of the string 17 with the frequency profiles of the pulsating torques close to the rotation speed for continuous operation result in undesired oscillations of the string 17. In the present diagram shown in FIG. 5, this can be the case close to the rotation speed of 3000 rpm.

As shown by way of example in FIG. 1, the system according to the disclosure can have a first motor 12 and a second motor 14. The motors 12, 14 are coupled mechanically to one another via a common string 17. The first motor 12 and the second motor 14 are designed to drive the string 17, wherein the string 17 can have a torsional natural frequency, wherein a first oscillating torque which can be dependent on the rotation speed acts on the string 17 by the first motor 12 and a second oscillating torque, which can be likewise dependent on the rotation speed, acts on the string 17 by the second motor. According to an exemplary embodiment of the present disclosure, the second motor 14 can be arranged with respect to the first motor 12 in such a way that, given a specified rotation speed of the string 17, the effect of the first oscillating torque and the second oscillating torque results in cancellation of the natural frequency on the string 17.

The cancellation of the excitation of the string 17 at a certain frequency can take place as follows, wherein the second drive 34 can be operated without any electrical phase shift $\Delta ph_N$ with respect to the first drive 32 in the text which follows, e.g., the voltages and/or the currents in the phase conductors 46, 47 between the first transformer 40 and the grid-side power converter 60 of the first converter 48 and between the second transformer 41 and the grid-side power converter 60 of the second converter 49 are in phase with one another. The phase shift angle $\Delta ph_N$ therefore, can be zero. Furthermore, a distinction can be drawn between an even and an odd oscillation at the natural frequency.

In the case of an even oscillation of the mechanical system, the two end regions of the system oscillate in synchronism with one another. The oscillation can therefore be cancelled by virtue of both ends of the system being excited in opposition. This can be achieved as follows:

The second rotor 22 can be rotated through 180° with respect to the first rotor 20, wherein the first stator 24 and the second stator 26 are aligned radially with one another, where therefore $\varphi_R=180°$, $\varphi_{St}=0°$ and $\Delta ph_M=\varphi_R=180°$; or The second stator 26 can be rotated through 180° with respect to the first stator 24, wherein the first rotor 20 and the second rotor 22 are aligned radially with one another, wherein therefore $\varphi_R=0°$, $\varphi_{St}=180°$ and $\Delta ph_M=\varphi_{St}=-180°$, where -180° can be equivalent to +180°; or The second stator 26 can be arranged so as to be rotated through an angle $\varphi_{St}$ with respect to the first stator 24, and the second rotor can be arranged around an angle $\varphi_R$ with respect to the first rotor, wherein the following applies for the angles: $\Delta ph_M=\varphi_R-\varphi_{St}=180°$.

It should be considered that the position "180°" can be equivalent to "−180°" since this can be the same position. Likewise, integral multiples of 360° added to 180° are equivalent positions.

If the pole pair number $N_{PP}$ can be different from 1, further equivalent angle positions are added. For $N_{PP}=2$, this can be 90° and 270°, in addition 45°, 135°, 225° and 315° for $N_{PP}=3$. For higher pole pair numbers there are correspondingly further angle positions.

In the case of odd harmonic oscillations of the mechanical system, the two end regions of the system oscillate in opposition to one another. The oscillation can therefore be cancelled by virtue of both ends of the system being excited in synchronism with one another. This can be achieved as follows:

The second stator 26 can be aligned radially with the first stator 24 and the first rotor 20 and the second rotor are likewise aligned radially with one another, wherein therefore $\varphi_R=0°$, $\varphi_{St}=0°$ and $\Delta ph_M=0°$; or The second stator 26 can be arranged rotated through an angle $\varphi_{St}$ with respect to the first stator 24, and the second rotor can be arranged around an angle $\varphi_R$ with respect to the first rotor, wherein the following applies for the angles: $\Delta ph_M=\varphi_{St}=0°$ In this case, consideration should be given to the fact that the position "0°" can be equivalent to integral multiples of 360°.

If the pole pair number $N_{PP}$ can be different from 1, further equivalent angle positions are added. For $N_{PP}=2$, these are 180°, for $N_{PP}=3$, additionally 90° and 270°. For higher pole pair numbers, there are correspondingly further angle positions.

However, it may also be desirable to operate the two drives 32, 34 on the side of the supply grid 42 with a phase shift with respect to one another in order to reduce the interference on the supply grid 42 caused by the drives 32, 34. In the case of a 12-pulse system, the grid-side power converter 60 of the second converter 49 can be operated with a phase shift of $\Delta ph_N=15°$ with respect to the grid-side power converter 60 of the first converter 48. This phase shift can be achieved by the second transformer 41. If the phase shift $\Delta ph_N$ can be different from 0°, this should be taken into consideration for the cancelling of the exciting oscillating torques.

Figure 6:
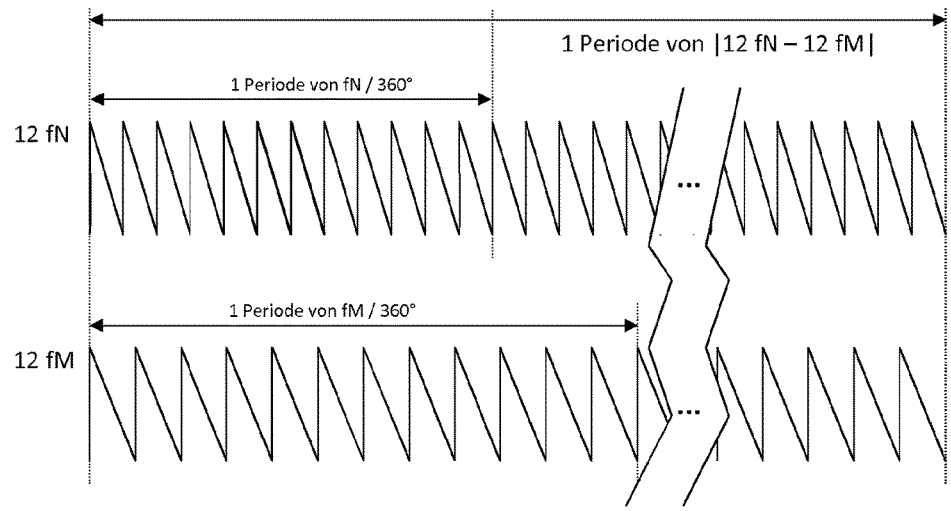
FIG. 6 shows the period length of the product of convolution of twelve times the line frequency $f_N$ and twelve times the motor frequency $f_M$ in accordance with an exemplary embodiment of the present disclosure.

FIG. 6 shows the period length of the product of convolution of twelve times the line frequency $f_N$ and twelve times the motor frequency $f_M$ in accordance with an exemplary embodiment of the present disclosure. In accordance with the illustration of FIG. 6, the product of convolution as described can be denoted by $|12 f_N - 12 f_M|$. As shown at the top of FIG. 6, the DC-voltage side of the grid-side 12-pulse power converter 60 of the first converter 48, which oscillates at twelve times the line frequency $f_N$. In order to simplify the illustration, a saw-tooth function has been selected. Furthermore, at the bottom FIG. 6 shows the DC-voltage side of the load-side power converter 62 of the first converter, which can be pulsed at twelve times the frequency of the load-side power converter 62. In turn, the voltage can be illustrated purely schematically as a saw-tooth function. A low-frequency beat can be produced between the pulsed DC voltage of the grid-side power converters 60 and the pulsed DC voltage of the load-side power converter 62, said low-frequency beat being visible as a low-frequency energy transfer in the first converter 48. Furthermore, this beat of the voltage in the storage DC link 64 of the first converter 48 results in a low-frequency, non-integral torque in the air gap of the first motor 12, which oscillates at the frequency of the low-frequency beat. The same implies in principle to the second converter 49 and the second motor 24. This is shown in the Campbell diagram in FIG. 5.

Figure 7:
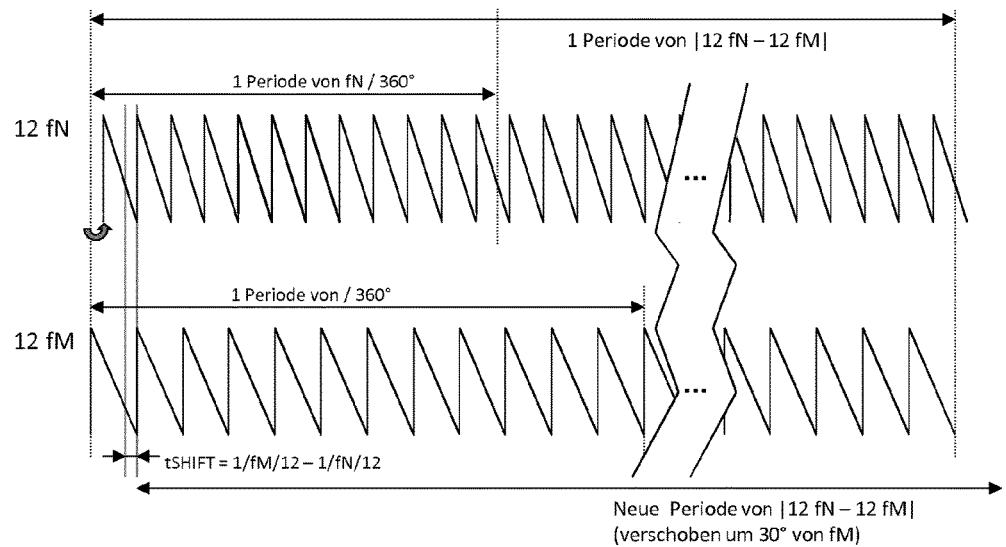
FIG. 7 shows twelve times the line frequency phase-shifted through 30° with respect to twelve times the line frequency shown in FIG. 6 in accordance with an exemplary embodiment of the present disclosure.

FIG. 7 shows twelve times the line frequency phase-shifted through 30° with respect to twelve times the line frequency shown in FIG. 6 in accordance with an exemplary embodiment of the present disclosure. In comparison to FIG. 6, FIG. 7 shows a condition relative to the second converter 49. In turn, the pulsed DC voltage of the grid-side power converter 60 and the pulsed DC voltage of the load-side power converter 62 are shown, but the voltage on the side of the supply grid 42 can be phase-shifted with respect to the line frequency $f_N$. The phase shift is $\Delta ph_N$. As described above, this phase shift can be achieved by a transformer. Similarly, to the above description of the first converter, a low-frequency beat again results in the storage DC link 64 of the second converter 49 and a low-frequency, non-integral torque results in the air gap of the second motor 14.

As can be derived from FIG. 6 and FIG. 7, the phase shift $\Delta ph_N$ of the frequency of the grid-side power converter 60 of the second converter 49 results in a phase shift of the low-frequency beat in the energy flow through the second converter 49 with respect to the low-frequency beat in the first converter 48 and therefore also the low-frequency, pulsating air-gap torque of the second motor 14 in comparison with the low-frequency, pulsating air-gap torque of the first motor 12. By comparison of FIG. 6 with FIG. 7, this shift can be derived from the frequency $f_N$ of the grid-side power converter 60, the phase shift through the phase shift angle $\Delta ph_N$ and the frequency $f_M$ of the load-side power converter 62 and can comply with the following law:

$$\Delta ph_M = \frac{\Delta ph_N}{360 \, deg} \frac{1}{f_N} \frac{N_N}{1/f_M - 1/f_N} (360°/N_M),$$

where $N_N$ is the number of pulses of the grid-side power converter, and $N_M$ is the number of pulses of the load-side power converter. If the number of pulses of the grid-side and load-side power converters is the same, the following applies:

$$\Delta ph_M = \Delta ph_N \frac{1}{f_N} \frac{1}{1/f_M - 1/f_N}.$$

The above formulae for $\Delta ph_M$ can apply for synchronous machines.

For at least one critical speed at which the beat frequency would coincide with a natural frequency of the torsional natural oscillation of the string 17, cancellation of the torsional natural oscillation on the load can now take place with the aid of the exemplary system according to the present disclosure.

For a correct forward rotation of the second rotor 22 with respect to the first rotor 20, the relative motor angle $\Delta ph_M = \varphi_R - \varphi_{St}$ in accordance with the above formula should be brought to 180° for even harmonic oscillations and to 0° for uneven harmonic oscillations of the load 17. In turn, integral multiples of 360° added to 0° or 180° are equivalent to 0° or 180°. For machines with a higher pole pair number $N_{PP}$, the value $180°/N_{PP}$ or $360°/N_{PP}$ applies analogously.

In the present exemplary embodiment, the load 17' can be a compressor system arranged on the shaft 16. This load 17' can have first torsional natural oscillations at the natural frequency of 6.48 Hz. The load 17' can be driven by two externally commutated converters 48, 49. The converters 48, 49 are connected to a supply grid at a line frequency of 60 Hz via in each case one transformer 40, 41. The rated frequency of the first and the second motors 12, 14 is likewise 60 Hz.

Given a rotation speed of 3567.6 rpm, which corresponds to 99.1% of the rated speed or the rated frequency of the motors, the product of convolution of twelve times the line frequency $f_N$ and twelve times the motor frequency $f_M$ excites the first harmonic oscillation. The mentioned product of convolution is illustrated in FIG. 5 by $|12f_M - 12f_N|$ (in FIG. 5, $f_N$ is denoted as $f_n$ and $f_M$ is denoted by $f_m$).

In accordance with an exemplary embodiment of the present disclosure, the excitation of the load 17 by the oscillating torques can be prevented or damped by virtue of the fact that the excitations by the first motor 12 and by the second motor 14 cancel one another out or at least damp one another. This can be achieved for the torsional first harmonic oscillation by virtue of the fact that the two oscillating torques caused by the convolution act in synchronism or in phase with the load.

If, owing to the reaction of the drive system 30 on the grid, the second drive 34 on the side of the supply grid 42 can be operated with a phase shift $\Delta ph_N$ of 15° with respect to the first drive 32, it follows from the above formula that the relative motor angle $\Delta ph_M$ between the second rotor 22 and the second stator 26 should be 1651.67° or 211.67°. If the second stator 26 can be aligned radially with respect to the first stator 24 and therefore $\varphi_{St} = 0°$ applies, it follows that the second rotor 22 should be arranged rotated radially with respect to the first rotor 24 through 211.67°. With this arrangement of the mechanical system, the oscillating torque which acts on the load can be cancelled in optimum fashion. If the angle $\Delta ph_M$ cannot be realized precisely, good cancelling of the oscillating torques can nevertheless be realized.

It should be understood that using the above formula for calculating $\Delta ph_M$, the optimum phase shift of the relative motor angle can be calculated. Deviations from this angle are possible and likewise at least partially result in cancelling or reduction of the excitation of the natural oscillation by the oscillating torques. For example, deviations from the relative motor angle $\Delta ph_M$ of up to +/−10° are permissible.

In further embodiments, the grid-side power converter 60 and/or the load-side power converter 62 of the first converter 48 and/or the second converter 49 can be in the form of self-commutated converters.

Instead of thyristors which can only be switched on, thyristors which can be switched off, for example a gate turn-off thyristor (GTO) or an IGC thyristor (IGCT) or a symmetrical GCT (SGCT) can be used, for example.

In principle, an asynchronous machine comprising a suitable converter having a current DC link can also be used.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention can be indicated by the appended claims rather than the foregoing description and all changes that come within the meaning and range and equivalence thereof are intended to be embraced therein.

LIST OF REFERENCE SYMBOLS

10 Mechanical system
12 First motor; first electric motor
14 Second motor; second electric motor
16 Shaft
17 String
17' Load, compressor system
20 First rotor
22 Second rotor
24 First stator
26 Second stator
30 Drive system
32 First drive
34 Second drive
40 First transformer
41 Second transformer
42 Supply grid
44 Phase conductor
46 Phase conductor
48 First converter
49 Second converter
50 Phase conductor
51 Phase conductor
60 Grid-side power converter
62 Load-side power converter
64 Storage DC link
66 Natural frequency of the shaft A Longitudinal axis
$N_{VN}$ Number of phase conductors of the supply grid
$N_{UM}$ Number of phase conductors between 40 and 48
$N_{AN}$ Number of phase conductors between 48 and 12
$N_{PP}$ Number of pole pairs
$\varphi_{St}$ Stator angle
$\varphi_R$ Rotor angle
$\Delta ph_M$ Relative motor angle
$f_{DC}$ Fundamental of VDC
$\Delta ph_N$ Phase shift angle
$f_{Mot}$ Motor frequency
rpm Number of revolutions per minute
$f_M$ Frequency of load-side power converter
$f_N$ Frequency of grid-side power converter
$N_N$ Number of pulses of grid-side power converter
$N_M$ Number of pulses of load-side power converter

What is claimed is:

1. A system comprising:
a first electric motor and a second electric motor, which are coupled mechanically to one another via a common string,
wherein the string has a torsional natural oscillation at a natural frequency,
wherein a first oscillating torque acts on the string by the first electric motor and a second oscillating torque acts on the string by the second electric motor, and
wherein the first electric motor and the second electric motor are arranged on respectively opposite end regions of the string, and
wherein the second electric motor is arranged with respect to the first electric motor such that an effect of the second oscillating torque on the string results in damping of an excitation of the natural oscillation by the first oscillating torque.

2. The system as claimed in claim 1, wherein the first electric motor is driven by a first drive, and the second electric motor is driven by a second drive, wherein the first drive and the second drive are current-source DC-link converters.

3. The system as claimed in claim 1, wherein one of the two electric motors is a synchronous machine.

4. The system as claimed in claim 1, wherein the first electric motor and the second electric motor is a synchronous machine.

5. The system as claimed in claim 1, wherein the first electric motor is driven by a first drive, and the second electric motor is driven by a second drive, wherein the first drive and the second drive are connected to a supply grid via phase conductors, the first drive has a first converter and the second drive has a second converter, wherein the first converter and the second converter are in each case externally commutated power converters on a side of the supply grid and on a side of the first electric motor and the second electric motor, respectively.

6. The system as claimed in claim 5, wherein the second converter is operated with a phase shift through a phase shift angle $\Delta ph_N$ with respect to the first converter.

7. The system as claimed in claim 6, wherein the second drive has a second transformer, by which the phase shift through the phase shift angle $\Delta ph_N$ is realized.

8. The system as claimed in claim 7, wherein the second electric motor is arranged to be radially rotated through a relative motor angle $\Delta ph_M$ with respect to the first motor, wherein the relative motor angle is at least approximately $$\Delta ph_M = \frac{\Delta ph_N}{360 \ deg} \frac{1}{f_N} \frac{N_N}{1/f_M - 1/f_N}(360°/N_M),$$

where $f_N$ is a frequency of the supply grid, $f_M$ is a frequency of the load-side power converter, $N_N$ is a pulse number of a grid-side power converter, $N_M$ is the pulse number of a load-side power converter.

9. The system as claimed in claim 8, wherein the second stator is arranged to be rotated radially through a stator angle $\varphi_{St}$ with respect to the first stator, the second rotor is arranged to be rotated radially through a rotor angle $\varphi_R$ with respect to the first rotor, wherein $\Delta ph_M = -\varphi_{St}$ holds true for the relative motor angle.

10. The system as claimed in claim 9, wherein the phase shift angle $\Delta ph_N$ is a grid-side electrical phase shift angle between the first converter and the second converter.

11. The system as claimed in claim 5, wherein the first converter and the second converter are each twelve-pulse power converters on the side of the supply grid and on the side of the first electric motor or the second electric motor.

12. The system as claimed in claim 11, wherein in each case one grid-side power converter of the first converter and of the second converter is an externally commutated thyristor power converter with phase gating control.

13. The system as claimed in claim 11, wherein in each case one load-side power converter of the first converter and of the second converter is in the form of an externally commutated thyristor power converter with phase gating control.

14. The system as claimed in claim 1, wherein the string has a compressor system as a load.

15. The system as claimed in claim 1, wherein the first electric motor and the second electric motor together have at least a power of 60 MW.

16. The system as claimed in claim 1, wherein the first electric motor has a first rotor and a first stator, the second electric motor has a second rotor and a second stator, wherein the second rotor is not radially aligned with the first rotor and/or the second stator is not radially aligned with the first stator.

* * * * *